United States Patent
Grinde et al.

(10) Patent No.: US 10,656,037 B2
(45) Date of Patent: May 19, 2020

(54) PRESSURE MODULATOR

(71) Applicant: General Electric Company, Schenectady, NY (US)

(72) Inventors: Christopher Grinde, Blommeholm (NO); Bjørn Erik Seeberg, Oslo (NO)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/415,852

(22) Filed: May 17, 2019

(65) Prior Publication Data

US 2019/0271605 A1 Sep. 5, 2019

Related U.S. Application Data

(63) Continuation of application No. 15/590,266, filed on May 9, 2017, now Pat. No. 10,295,423, which is a (Continued)

(51) Int. Cl.
*G01L 13/02* (2006.01)
*F16K 31/126* (2006.01)
(Continued)

(52) U.S. Cl.
CPC .............. *G01L 13/026* (2013.01); *F15C 3/04* (2013.01); *F16K 7/10* (2013.01); *F16K 31/126* (2013.01);
(Continued)

(58) Field of Classification Search
CPC . F16K 31/126; F16K 7/10; F15C 3/04; G01L 19/0015; G01L 19/0046;
(Continued)

(56) References Cited

U.S. PATENT DOCUMENTS 2,667,184 A * 1/1954 Hailer ...................... G01G 5/00
  92/98 R
4,163,395 A * 8/1979 Medlar ................. G01L 9/0054
  73/708
(Continued)

FOREIGN PATENT DOCUMENTS

| DE | 688097 C | 2/1940 |
|----|----------|--------|
| DE | 1947533 A1 | 3/1971 |
| GB | 1173624 A | 12/1969 |
| WO | 2013036144 A2 | 3/2013 |

OTHER PUBLICATIONS

International Search Report and Written Opinion issued in connection with corresponding PCT Application No. PCT/US2015/059811 dated Feb. 23, 2016.

*Primary Examiner* — Nathaniel T Woodward
(74) *Attorney, Agent, or Firm* — Mintz Levin Cohn Ferris Glovsky and Popeo, P.C.

(57) ABSTRACT

An apparatus and associated method, for controlling signal passage, includes a first passageway for a first fluid, a second passageway for a second fluid, and an interposed chamber. A first, movable diaphragm at a first chamber junction and a second, movable diaphragm at a second chamber junction, with a third fluid bound there between and interposed between the first and second passageways. A device varies a volume of the third fluid bound between the diaphragms and thus moves the diaphragms. A movable member and a reservoir of the device are configured such that the movable member is sufficiently movable to increase the volume of the reservoir to remove a sufficient portion of the third fluid bound between the first and second diaphragms from the chamber to cause the first and second diaphragms to be pressed against the first and second walls, respectively.

20 Claims, 3 Drawing Sheets

Related U.S. Application Data continuation of application No. 14/551,296, filed on Nov. 24, 2014, now Pat. No. 9,683,675.

(51) Int. Cl.
*F16K 7/10* (2006.01)
*G05D 16/04* (2006.01)
*F15C 3/04* (2006.01)
*G01L 19/00* (2006.01)
*G01L 7/08* (2006.01)
G01L 15/00 (2006.01)
G05D 16/06 (2006.01)
G05D 16/08 (2006.01)

(52) U.S. Cl.
CPC .......... *G01L 7/088* (2013.01); *G01L 19/0015* (2013.01); *G01L 19/0046* (2013.01); *G05D 16/0404* (2019.01); *G01L 7/08* (2013.01); *G01L 13/02* (2013.01); *G01L 15/00* (2013.01); *G05D 16/06* (2013.01); *G05D 16/08* (2013.01)

(58) Field of Classification Search
CPC ............. G01L 19/0045; G01L 19/0084; G01L 19/0038; G01L 19/0007; G01L 19/14; G01L 19/003; G01L 19/146; G01L 19/147; Y10T 29/49822
USPC .............. 73/715, 716, 756; 361/283.1–283.4
See application file for complete search history.

(56) References Cited

U.S. PATENT DOCUMENTS

| | | | |
|---|---|---|---|
| 4,237,881 A * | 12/1980 | Beigler | A61M 5/1483 128/205.13 |
| 4,798,089 A * | 1/1989 | Frick | G01L 9/0072 73/706 |
| 5,095,755 A | 3/1992 | Peterson | |
| 5,808,204 A * | 9/1998 | Chang | G01L 27/005 73/714 |
| 6,474,168 B1 | 11/2002 | Meringdal | |
| 6,631,644 B2 * | 10/2003 | Burczyk | G01L 13/025 73/715 |
| 6,886,409 B2 * | 5/2005 | Carpay | B01L 3/5025 73/716 |
| 6,966,229 B2 | 11/2005 | Seeberg | |
| 7,278,318 B2 * | 10/2007 | Dannhauer | G01L 13/025 73/716 |
| 7,503,220 B2 * | 3/2009 | Sittler | G01L 9/0075 73/715 |
| 7,509,865 B2 * | 3/2009 | Burczyk | G01L 13/025 73/715 |
| 8,122,771 B2 | 2/2012 | Seeberg et al. | |
| 8,276,456 B2 * | 10/2012 | Seeberg | G01L 13/028 73/715 |
| 2013/0036144 A1 | 2/2013 | Ladd | |
| 2013/0047737 A1* | 2/2013 | Vagle | G01L 19/0645 73/716 |

\* cited by examiner

PRESSURE MODULATOR

RELATED APPLICATION

This application is a Continuation of, and benefit of priority is claimed from, U.S. patent application Ser. No. 14/551,296, filed on Nov. 24, 2014, the entire disclosure of which is incorporated herein by reference.

BACKGROUND

Field of the Disclosed Subject Matter

The disclosed subject matter relates to an apparatus for controlling transmission of a fluid pressure signal.

Discussion of Prior Art

Within certain environments or other situations, it may be desirable to isolate fluid(s) that contains/conveys a signal (e.g., a pressure signal). For example, isolating a signal receiving device or fluid associated with such a device from contamination, chemical attack, etc. that could be result from contact with certain fluids may be beneficial. Such may occur for various environments or other situations, such as under water drilling, and/or hydrocarbon (e.g., oil, gas) extraction, processing, transport, etc. Within certain environments or other situations, it may be desirable to control (e.g., isolate/block/pass) conveyance of a signal contained within a fluid. It is further appreciated that within certain environments or other situations it may be desirable to control conveyance of multiple signals contained within multiple fluids. Still further, it is appreciated that within certain environments or other situations it may be desirable to control conveyance of multiple signals contained within multiple fluids, while maintaining isolation of the multiple fluids.

One example environment/situation concerns a pressure sensor unit for use preferably in under water plants for transport and processing of hydrocarbon streams, particularly in connection with "Christmas tree devices" on the sea floor. Pressure measurements are necessary on many different points in such plants.

BRIEF DESCRIPTION OF THE DISCLOSED SUBJECT MATTER

The following summary presents a simplified summary in order to provide a basic understanding of some aspects of the arrangements and/or methods discussed herein. This summary is not an extensive overview of the arrangements and/or methods discussed herein. It is not intended to identify key/critical elements or to delineate the scope of such arrangements and/or methods. Its sole purpose is to present some concepts in a simplified form as a prelude to the more detailed description that is presented later.

In accordance with one aspect, the disclosed subject matter provides an apparatus for controlling passage of a pressure signal. The apparatus includes a first passageway for a first fluid therein and a second passageway for a second fluid therein. The apparatus includes a chamber interposed between the first and second passageways. The chamber is partially bounded by a first wall adjacent a junction of the first passageway to the chamber and a second wall adjacent a junction of the second passageway to the chamber. The first wall is contoured as a convex shape with regard to the chamber and the second wall is contoured as a convex shape with regard to the chamber. The apparatus includes a first, movable diaphragm located across a junction of the first passageway and the chamber. The first diaphragm is movable to plural positions including a position with the first diaphragm pressed against the first wall. The apparatus includes a second, movable diaphragm located across a junction of the second passageway and the chamber. The second diaphragm is movable to plural positions including a position with the second diaphragm pressed against the second wall. The apparatus includes a third fluid. The first and second diaphragms bound the third fluid there between and are interposed between the first and second passageways at the chamber. The apparatus includes a device for varying a volume of the third fluid bound between the first and second diaphragms and interposed between the first and second passageways at the chamber. A variation of the volume of the third fluid moves the first and second diaphragms. The device includes a movable member and a reservoir in fluid communication with the third fluid bound between the first and second diaphragms. The movable member is movable to vary the volume of the reservoir. The movable member and the reservoir are configured such that the movable member is sufficiently movable to increase the volume of the reservoir to remove a sufficient portion of the third fluid bound between the first and second diaphragms from the chamber to cause the first and second diaphragms to be pressed against the first and second walls, respectively.

In accordance with one aspect, the disclosed subject matter provides a method for controlling passage of a pressure signal. The method includes providing an apparatus for controlling passage of a pressure signal. The apparatus includes a first passageway for a first fluid therein and a second passageway for a second fluid therein. The apparatus includes a chamber interposed between the first and second passageways. The chamber is partially bounded by a first wall adjacent a junction of the first passageway to the chamber and a second wall adjacent a junction of the second passageway to the chamber. The first wall is contoured as a convex shape with regard to the chamber and the second wall is contoured as a convex shape with regard to the chamber. The apparatus includes a first, movable diaphragm located across a junction of the first passageway and the chamber. The first diaphragm is movable to plural positions including a position with the first diaphragm pressed against the first wall. The apparatus includes a second, movable diaphragm located across a junction of the second passageway and the chamber. The second diaphragm is movable to plural positions including a position with the second diaphragm pressed against the second wall. The apparatus includes a third fluid. The first and second diaphragms bound the third fluid there between and are interposed between the first and second passageways at the chamber. The apparatus includes a device for varying a volume of the third fluid bound between the first and second diaphragms and interposed between the first and second passageways at the chamber. A variation of the volume of the third fluid moves the first and second diaphragms. The device includes a movable member and a reservoir in fluid communication with the third fluid bound between the first and second diaphragms. The movable member is movable to vary the volume of the reservoir. The method includes moving the movable member sufficiently to increase the volume of the reservoir to remove a sufficient portion of the third fluid bound between the first and second diaphragms from the chamber to cause the first and second diaphragms to be pressed against the first and second walls, respectively.

BRIEF DESCRIPTION OF THE DRAWINGS

The foregoing and other aspects of the disclosed subject matter will become apparent to those skilled in the art to which the subject matter relates upon reading the following description with reference to the accompanying drawings, in which.

DESCRIPTION OF THE DISCLOSED SUBJECT MATTER

Example embodiments that incorporate one or more aspects of the disclosed subject matter are described and illustrated in the drawings. These illustrated examples are not intended to be a limitation. For example, one or more aspects of the disclosed subject matter can be utilized in other embodiments and even other types of devices. Moreover, certain terminology is used herein for convenience and ease of identification only and is not to be taken as a limitation on the disclosed subject matter. For example, the terms first, second, etc. are used for convenience and ease of identification only. Still further, in the drawings, the same reference numerals are employed for designating the same elements.

Figure 1:
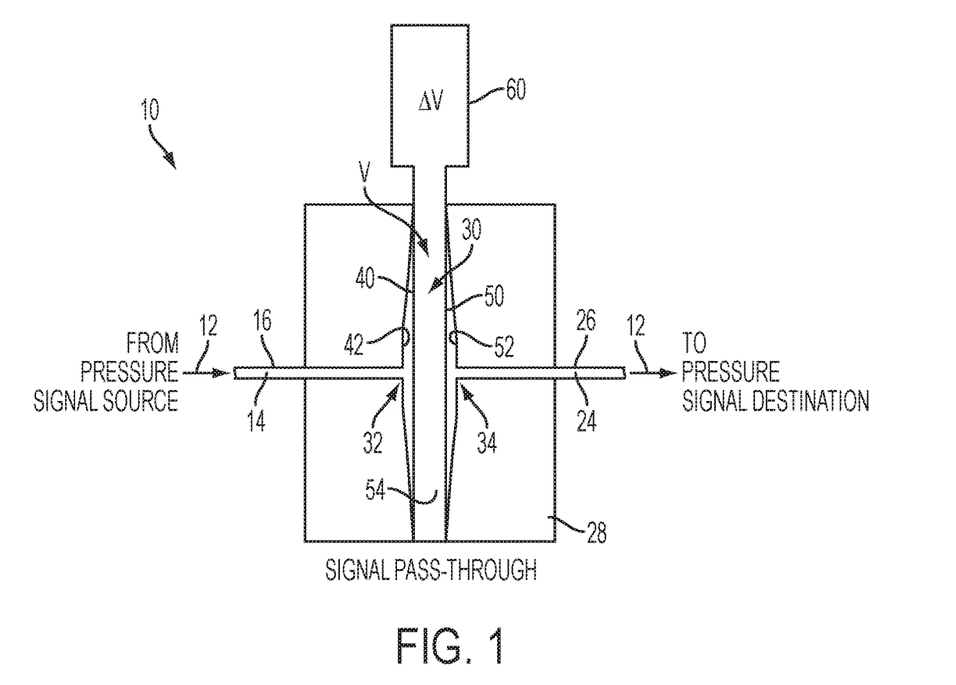
FIG. 1 is a schematic illustration of an example apparatus for controlling passage of a pressure signal in accordance with an aspect of the disclosed subject matter, and showing the apparatus in a first operational condition.

An example of an apparatus 10 for controlling passage of a fluid pressure signal 12 is schematically shown within FIG. 1. The control of passage of a fluid pressure signal can be considered as pressure modulation. As such, the apparatus 10 can be considered to be a pressure modulator.

The fluid pressure signal 12 indicates/conveys fluid pressure information. The pressure information may itself be an indication/conveyance of information. The fluid pressure signal 12 can vary over time. It is to be appreciated that the fluid pressure signal 12 is itself schematically represented via the arrowhead with FIG. 1. The fluid pressure signal is within a first fluid 14. The first fluid 14 can be any fluid such as oil, hydraulic fluid, water, such as sea water, etc. The specifics of the first fluid 14 need not be specific limitations upon the present disclosed subject matter. The first fluid 14 is with a first passageway 16.

In general, the first passageway 16 is any structure that is in fluid connection with a source (not shown, but referenced via text within FIG. 1) that provides the pressure signal 12 within the first fluid 14 within the first passageway 16. The first passageway 16 may include piping, conduit, portals, etc. The specifics of the first passageway 16 can be varied and need not be specific limitations upon the disclosed subject matter. The pressure signal source may be anything that provides the pressure signal 12 within the first fluid 14 within the first passageway 16. For example, the pressure signal source may be associated with a sensing element within an undersea oil drilling and/or extraction arrangement. As another example, the pressure signal source may be associated with an undersea pressure sensor. Also, the pressure signal source may be anything (i.e., oil, water, such as sea water, etc.) that itself provides pressure as the pressure signal.

The provided control is selective control of passage of the fluid pressure signal 12 to a second fluid 24 within a second passageway 26. In general, the second passageway 26 is any structure that is in fluid connection with a pressure signal destination (not shown, but referenced via text within FIG. 1). The second passageway 26 may include piping, conduit, portals, etc. The specifics of the second passageway 26 can be varied and need not be specific limitations the disclosed subject matter. The pressure signal destination may be anything that is intended to receive the pressure signal 12 and need not be a specific limitation upon the disclosed subject matter. For example, the pressure signal destination may be associated with one or more components that are involved with sensing, recording, measuring, comparing, processing, etc. information about the pressure. The specifics of the second fluid 24 need not be specific limitation upon the disclosed subject matter. As examples, the second fluid 24 may be oil, hydraulic fluid, water, glycerol, etc.

A body 28 (schematically shown) has a chamber 30 of the apparatus 10, and the chamber is provided to be interposed between the first and second passageways 16, 26. The body 28 can be any structure, construction, material, etc. and need not be a specific limitation. At least a portion of the chamber 30 is in fluid communication within the first passageway 16 at a first junction 32. Also, at least a portion of the chamber 30 is in fluid communication within the second passageway 26 at a second junction 34. In one specific example, the portion of the chamber 30 in fluid communication within the first passageway 16 is different from the portion of the chamber in fluid communication within the second passageway 26. The specific size, shape, etc. of the chamber 30 need not be specific limitations.

A first, movable diaphragm 40 of the apparatus 10 is located within the chamber 30. Specifically, the first diaphragm 40 is located across the junction 32 (i.e., the first junction) of the first passageway 16 and the chamber 30. The first fluid 14 engages one side of the first diaphragm 40.

The first diaphragm 40 is movable to plural positions. Specifically, the first diaphragm 40 is movable between a first position, which is shown within FIG. 1, to a second position, which is shown within FIG. 2. In one specific example, the first diaphragm 40 is at least partially flexible to move. However, is it to be appreciated that the first diaphragm 40 may be otherwise movable (i.e., non-flexing movement). Within one example, the first diaphragm 40 is solid/non-permeable so as to prevent fluid movement past/through the first diaphragm.

Within one example, the chamber 30 is partially bounded by a first wall 42 at/adjacent to the first junction 32 (i.e., the connection of the first passageway 16 into the chamber). The first wall 42 has a shape, and the shape may be varied. The shape is such that when the first diaphragm 40 is in the second position (FIG. 2), the first diaphragm is in engagement with the first wall 42. The engagement may be full engagement or partial engagement. Within one example, with the first diaphragm 40 in engagement with the first wall 42, an end of the first passageway 16 is adjacent a middle portion of the first diaphragm, but the first diaphragm is in a blocking position.

Within one example, the shape of the first wall 42, and thus also the shape of the first diaphragm 40 engaged there against when in the second position (FIG. 2), is of contoured/curved shape. Within one specific example, the first wall 42 is contoured, and the contouring is spherical or spheroid (e.g., sphere-like but not perfectly spherical, such as generated by revolution of an ellipse about its major axis), toric or similar. Within other examples, the contouring can include a series of segments that each can be curved or flat to provide a general spherical or spheroid shape.

A second, movable diaphragm 50 of the apparatus 10 is located within the chamber 30. Specifically, the second diaphragm 50 is located across the junction 34 (i.e., the second junction) of the second passageway 26 and the chamber 30. The second fluid 24 engages one side of the second diaphragm 50.

The second diaphragm 50 is movable to plural positions. Specifically, the second diaphragm 50 is movable between a first position, which is shown within FIG. 1, to a second position, which is shown within FIG. 2. In one specific example, the second diaphragm 50 is at least partially flexible to move. However, is it to be appreciated that the second diaphragm 50 may be otherwise movable (i.e., non-flexing movement). Within one example, the second diaphragm 50 is solid/non-permeable so as to prevent fluid movement past/through the second diaphragm.

Within the one example, the chamber 30 is partially bounded by a second wall 52 at/adjacent the second junction 34 (i.e., the connection of the second passageway into the chamber). The second wall 52 has a shape, and the shape may be varied. The shape is such that when the second diaphragm 50 is in the second position (FIG. 2), the second diaphragm is in engagement with the second wall 52. The engagement may be full engagement or partial engagement. Within one example, with the second diaphragm 50 in engagement with the second wall 52, an end of the second passageway 26 is adjacent a middle portion of the second diaphragm, but the second diaphragm is in a blocking position.

Within one specific example, the second wall 52 is contoured, and the contouring is spherical or spheroid (e.g., sphere-like but not perfectly spherical, such as generated by revolution of an ellipse about its major axis), toric or similar. Within other examples, the contouring can include a series of segments that each can be curved or flat to provide a general spherical or spheroid shape.

Beyond movability and wall engagement, the specifics (e.g., material, size, shape, etc.) of the first and second diaphragms 40 and 50 need not be specific limitations.

The first and second diaphragms 40 and 50 are spaced from each other within the chamber 30 so as to bound a volume V there between and within the chamber. A third fluid 54 is located within the volume V bound between the first and second diaphragms 40, 50. As such, the third fluid 54 is within the chamber 30, and the chamber houses the third fluid. Moreover, the third fluid 54 is interposed between the first and second passageways 16, 26 at the chamber 30. So, the first and third fluids 14, 54 engage respective sides of the first diaphragm 40, and the second and third fluids 24, 54 engage respective sides of the second diaphragm 50.

The third fluid 54 can be any fluid such as oil, hydraulic fluid, water, etc. In one specific example, the third fluid 54 is nearly incompressible. In one example, the third fluid 54 fills the volume V. As such, the volume V itself and the volume of the third fluid 54 that fills the volume can be considered to be the same.

It is to be appreciated that in view of the movability of the first and second diaphragms 40, 50, the size of the volume V bound there between is variable. Specifically, the size of the volume V varies in correlation to the amount of the third fluid 54 within the chamber 30. Of course, the first and second diaphragms 40, 50 move in a relationship to the volume of the third fluid 54 there between.

The apparatus 10 includes a device 60 for varying/changing (e.g., $\Delta V$) the volume V of the third fluid 54 bound between the first and second diaphragms 40, 50 and interposed between the first and second passageways 16, 26 at the chamber 30. A variation $\Delta V$ of the volume V of the third fluid 54 can move the first and second diaphragms 40, 50. The device 60 for varying $\Delta V$ the volume V of the third fluid 54 can be any device to add/subtract from the volume of the third fluid within the chamber. Such may be done via pumping fluid from/to a fluid reserve located outside of the chamber 30, applying varying pressure to the fluid reserve, applying pressure/vacuum to the fluid reserve to move fluid, etc. The specifics of the device 60 for varying $\Delta V$ the volume V of the third fluid 54 bound between the first and second diaphragms 40, 50 need not be specific limitations.

Figure 2:
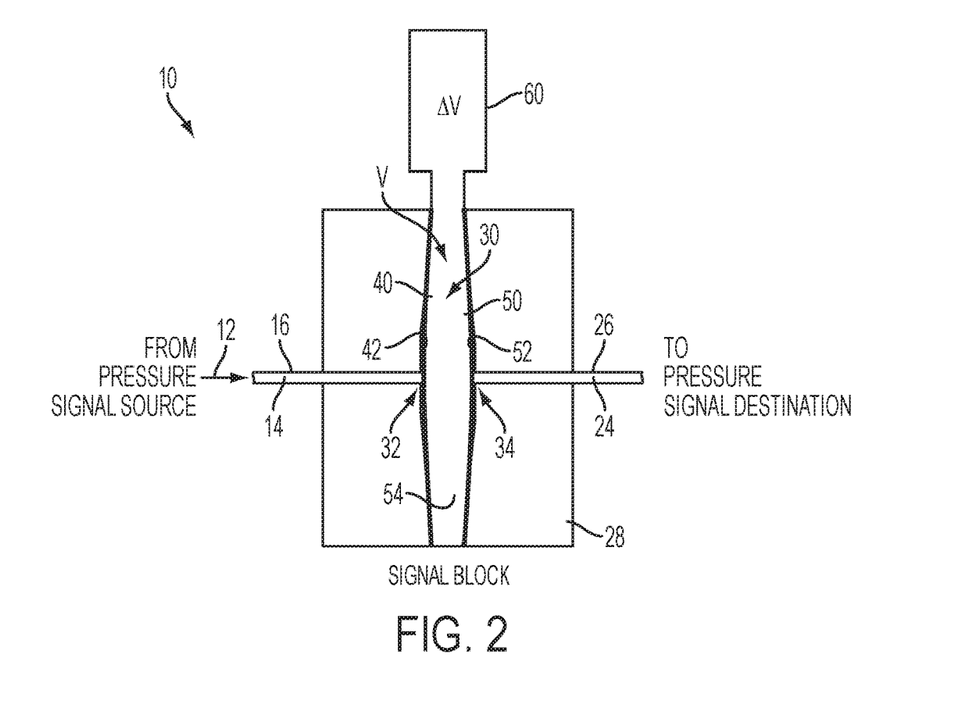
FIG. 2 is a schematic illustration similar to FIG. 1, but showing the apparatus in a second operational condition.

As mentioned, the variation/change $\Delta V$ of fluid volume V of the third fluid 54 within the chamber 30 can be associated with movement of the first and second diaphragms 40, 50. For example, FIG. 1 shows a first volume V of the third fluid 54 within the chamber 30. As mentioned, the first and second diaphragms 40, 50 are each at a respective first position within FIG. 1. FIG. 2 shows a second, different (i.e., greater) volume V of the third fluid 54 within the chamber 30. As mentioned, the first and second diaphragms 40, 50 are each at a respective second position within FIG. 2. So, within the shown example, the change $\Delta V$ of volume V of the third fluid 54 from the first volume amount to the second volume amount (i.e., an increase in volume) causes a change from the first position (FIG. 1) to the second position (FIG. 2) for both of the first and second diaphragms 40, 50.

For each of the first and second diaphragms 40, 50, when the respective diaphragm is not against the associated wall 42, 52 of the chamber 30 (e.g., each respectively in the first position or similar as shown within FIG. 1), the respective diaphragm can be considered to be un-damped. By that, each respective diaphragm 40, 50 can slightly move (e.g., vibrate, flutter, etc.). Such slight movement can be caused by signals traveling within the fluids that engage against the respective diaphragm. Recall that the first and third fluids 14, 54 engage respective sides of the first diaphragm 40, and the second and third fluids 24, 54 engage respective sides of the second diaphragm 50.

When a slight movement caused by a signal (e.g., 12) traveling within one fluid (e.g., 14) engaged against a respective diaphragm (e.g., 40) occurs, the slight movement is transmitted to the other fluid (e.g., 54) engaged against that respective diaphragm (e.g., 40). Such can be referred to as transmission of the signal (e.g., 12). For example, a pressure signal within one of the fluids that engages against the respective diaphragm can be transmitted through the respective diaphragm to the other engaging fluid as a pressure signal. For the first diaphragm 40, the fluids that engage against the diaphragm are the first fluid 14 and the third fluid 54. So, a pressure signal 12 that is within the first fluid 14 can be transmitted to the third fluid 54 via the un-damped first diaphragm 40. For the second diaphragm 50 the fluids that engage against the diaphragm are the third fluid 54 and the second fluid 24. So, a pressure signal that is within the third fluid 54 can be transmitted to the second fluid 24 via the un-damped second diaphragm 50. As just mentioned, a pressure signal 12 can be present in the third fluid 54 via transmission from the first fluid 14 via the first diaphragm 40. So, as schematically illustrated via the second arrowhead in FIG. 1, the pressure signal 12 is transmitted to the second fluid 24 and can progress toward the pressure signal destination.

For each of the first and second diaphragms 40, 50, when the respective diaphragm is against the associated wall 42, 52 of the chamber 30 (i.e., each respectively in the second, blocking position as shown within FIG. 2), the respective diaphragm can be considered to be damped. By that, each respective diaphragm 40, 50 is prevented/stifled from the slight movement (e.g., vibration, flutter, etc. is prevented/stifled). Such prevented/stifled movement can be caused by the volume V of the third fluid 54 pressing the respective diaphragm 40, 50 against the respective wall 42, 52 of the chamber 30. Signals (e.g., 12) traveling within the fluids (e.g., 14) that engage against the respective diaphragm (e.g., 40) cannot cause the above-discussed slight movement. So, there is no transmission of the signal (e.g., 12) through the respective diaphragm (e.g., 40). For example, a pressure signal (e.g., 12) within one of the fluids (e.g., 14) that engages against the respective diaphragm (e.g., 40) is not transmitted through the respective diaphragm to the other engaging fluid (e.g., 54). The pressure signal (e.g., 12) is prohibited from passage (e.g., blocked) and does not go from one adjacent fluid (e.g., 14) to the other adjacent fluid (e.g., 54). So, a pressure signal 12 that is within the first fluid 14 is not transmitted to the third fluid 54.

Accordingly, each of the first and second diaphragms 40, 50 has at least one position (e.g., the respective first position, see FIG. 1) that permits passage of the pressure signal 12. Also, each of the first and second diaphragms 40, 50 has at least one position (e.g., the respective second position, see FIG. 2) that prohibits (e.g., blocks) passage of the pressure signal 12.

It is to be recalled that the chamber 30, and the first and second diaphragms 40, 50 located therein, are located to be interposed between the first and second passageways 16, 26. So, the first and second diaphragms 40, 50 has at least one position (e.g., the respective first position, FIG. 1, there could be multiple positions) that permits transmission or passage of the pressure signal 12 between the first fluid 14 in the first passageway 16 and the second fluid 24 in the second passageway 26 through the third fluid 54 bound between the first and second diaphragms 40, 50. See that within FIG. 1 this transmission or passage is schematically represented via the first arrowhead that proceeds in the first passageway 16 and the second arrowhead that proceeds in the second passageway 26.

Also, each of the first and second diaphragms 40, 50 has at least one position (e.g., the respective second position, FIG. 2, there could be multiple positions) that prohibits passage of the pressure signal 12 between the first fluid 14 in the first passageway 16 and the second fluid 24 in the second passageway 26 through the third fluid 54 bound between the first and second diaphragms 40, 50. See that within FIG. 2 this prohibited passage is schematically represented via the single arrowhead that proceeds in the first passageway 16, but there is a lack of a second arrowhead that proceeds in the second passageway 26 (i.e., the pressure signal did not proceed into the second fluid 24 within the second passageway).

It is possible to consider the apparatus 10 as a fluid signal (e.g., fluid pressure signal) transistor. The third fluid 54, which is located between the first and second diaphragms 40, 50 within the chamber 30, selectively controls the passage of the signal 12 (e.g., pressure signal) between the first fluid 14 in the first passageway 16 and the second fluid 24 in the second passageway 26. The selective control is via variation of the third fluid volume V.

It is to be appreciated that the shown example could also be for a potential signal proceeding in the opposite direction (e.g., from the second fluid 24 within the second passageway 26 to the first fluid 14 within the first passageway 16). In other words, a signal proceeds from right to left within FIGS. 1 and 2. As such, the apparatus could provide selective control of the passage of such a signal (e.g., pressure signal) from the second fluid 24 in the second passageway 26 to the first fluid 14 in the first passageway 16.

Figure 3:
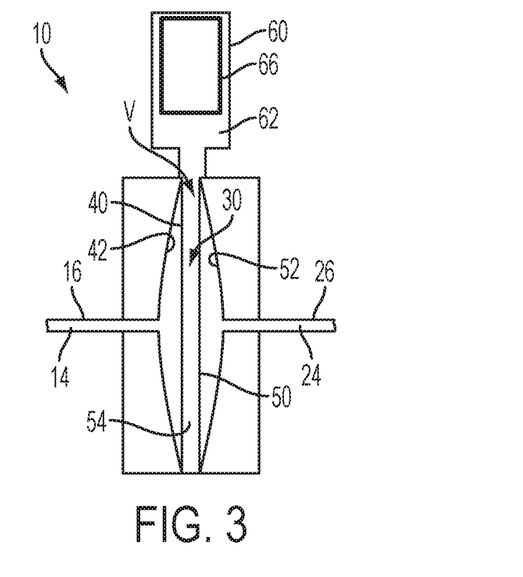
FIGS. 3 and 4 are schematic illustrations similar to FIGS. 1 and 2, and show one schematic example of a device for varying a volume within the apparatus.
Figure 4:
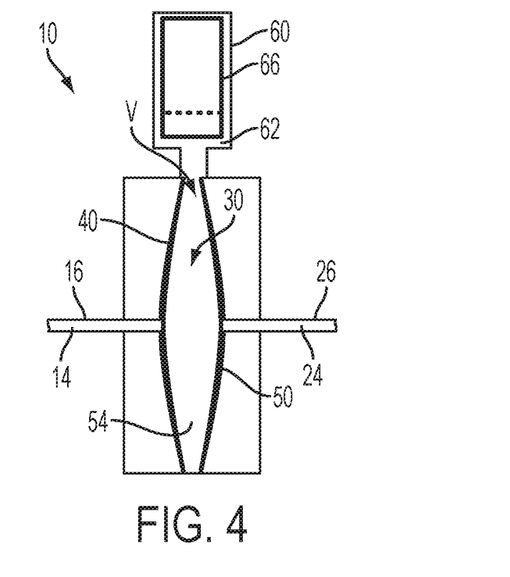

As mentioned, the device 60 for varying (e.g., ΔV) the volume V of the third fluid 54 bound between the first and second diaphragms 40, 50 and interposed between the first and second passageways 16, 26 at the chamber 30 can be any device to add/subtract from the volume of the third fluid within the chamber 30. FIGS. 3 and 4 schematically show some further details of one example. The example device 60 has a reservoir 62 that is in fluid connection with the third fluid 54 within the chamber 30 located between the first and second diaphragms 40, 50. As such the reservoir 62 also contains the third fluid 54. Within the reservoir 62, a member 66 (e.g., a piston, bladder, etc.) can move (compare FIGS. 3 and 4) to displace fluid with regard to the reservoir 62. Specifically, FIG. 4 shows that the member 66 has moved relative to a position of the member shown within FIG. 3. FIG. 4 shows the previous position from FIG. 3 via a phantom dash line for comparison reference.

The displacement of fluid relative to the reservoir 62 will flow to/from the volume V within the chamber 30 between the first and second diaphragms 40, 50. As can be seen within FIG. 3, the amount of the third fluid 54 within the reservoir 62 via a first position of the member 66 is such that the first and second diaphragms 40, 50 are in their receptive first positions. FIG. 4 shows that the member 66 within the reservoir 62 has been moved from the first position (represented by the dash lines in FIG. 4) to the second, different position. The movement has displaced some of the third fluid 54 out of the reservoir 62 and into the volume V (i.e., variable volume) between the two diaphragms 40, 50 within the chamber 30. As such, the diaphragms 40, 50 have been moved to their respective second positions.

Figure 5:
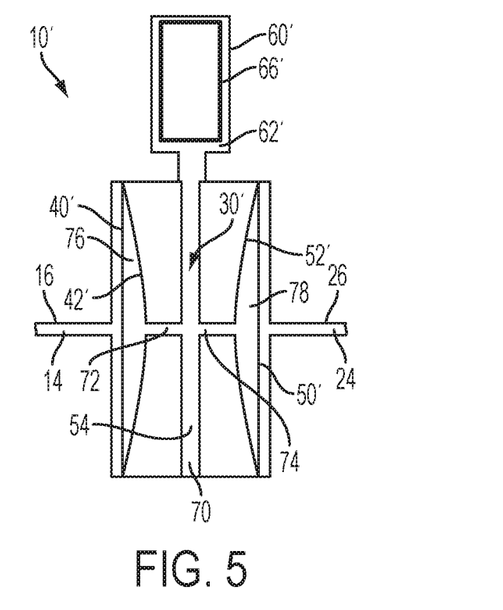
FIGS. 5 and 6 are schematic illustrations similar to FIGS. 3 and 4, but show another example apparatus for controlling passage of a pressure signal in accordance with an aspect of the disclosed subject matter.
Figure 6:
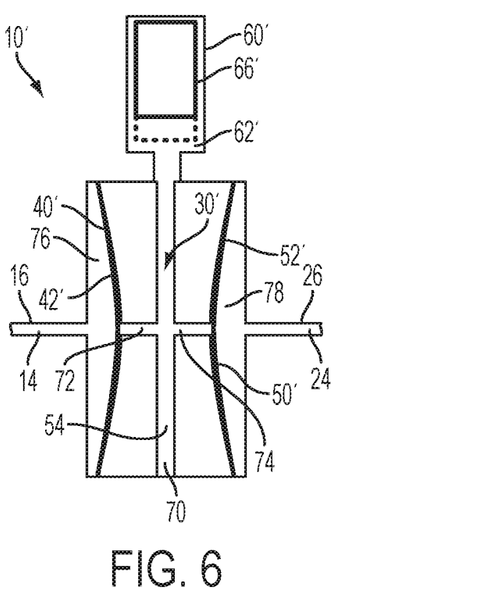

As mentioned, the specific size, shape, etc. of the chamber 30 need not be specific limitations. Also as mentioned, the specifics of the first and second diaphragms 40, 50 need not be specific limitations. FIGS. 5 and 6, present an example apparatus 10' that illustrates such aspects. As a comparison, note that within FIGS. 1-4, the presented chamber 30 has a general convex appearance as it is viewed in a schematic cross-section. The chamber 30 could be considered to be homogenous or of singular construction. Also note that the associated walls 42, 52 of the chamber 30 against which the first and second diaphragms 40, 50 can engage are concave from a view point perspective within the chamber 30.

Turning back to FIGS. 5 and 6, note structures that differ or may differ, but generally provide similar function, are designated with reference numerals that include a "'" (prime). Focusing upon the chamber 30', note that the chamber includes several segments. Specifically, the chamber 30' includes a central part 70, two Tee parts 72, 74 extending from the central part, and two dish parts 76, 78 that are respectively connected to the two Tee parts 72, 74. The two dish parts 76, 78 are convex when viewed from a view point perspective of the central part 70 within the chamber (i.e., concave when viewed outside of the chamber). These dish parts 76, 78 are provided by walls 42', 52' and it is against these wall that the respective diaphragms 40', 50' can engage. It is possible to describe the example of FIGS. 5 and 6 as having an inversion of structure when compared to the example(s) of FIGS. 1-4.

Similar to the example of FIGS. 3 and 4, the apparatus of FIGS. 5 and 6 has a device 60' for varying the volume (e.g., ΔV) that includes a moveable member 66' (e.g., a piston, bladder, etc.) in a reservoir 62' to displace a third fluid with regard to the reservoir. Similar to the example(s) of FIGS. 1-4, the first and second diaphragms 40', 50' have first and second positions. When the diaphragms 40', 50' are not against the associated walls 42', 52' of the chamber 30' (e.g., each respectively in the first position as shown within FIG. 5), the respective diaphragm can be considered to be un-damped. By that, each respective diaphragm 40', 50' can slightly move (e.g., vibrate, flutter, etc.). Such slight movement can be caused by signals traveling within the fluids that engage against the respective diaphragm. Thus, transmission of the signal occurs. For example, a pressure signal within one of the fluids that engages against the respective diaphragm can be transmitted through the respective diaphragm to the other engaging fluid. For the first diaphragm 40', the fluids that engage against the diaphragm are the first fluid 14 and the third fluid 54. So, a pressure signal that is within the first fluid 14 can be transmitted to the third fluid 54 via the un-damped first diaphragm 40'. For the second diaphragm 50', the fluids that engage against the diaphragm are the third fluid 54 and the second fluid 24. So, a pressure signal that is within the third fluid 54 can be transmitted to the second fluid 24 via the un-damped second diaphragm 50'. As just mentioned, a pressure signal can be present in the third fluid 54 via transmission from the first fluid 14 via the first diaphragm 40'.

For each of the first and second diaphragms 40', 50' when the respective diaphragm is against the associated wall 42', 52' of the chamber 30' (i.e., each respectively in the second position as shown within FIG. 6), the respective diaphragm can be considered to be damped. By that, each respective diaphragm 40', 50' is prevented/stifled from the slight movement (e.g., vibration, flutter, etc. is prevented/stifled). Such prevented/stifled movement can be caused by the volume of the third fluid 54 causing a pressing engagement of the respective diaphragm 40', 50' against the respective wall 42', 52' of the chamber 30'. Signals traveling within the fluids that engage against the respective diaphragm 40', 50' cannot cause the slight movement. So, there is no transmission of the signal (e.g., a pressure signal) through the respective diaphragm 40', 50'.

Such pressing of respective diaphragm 40', 50' against the respective wall 42', 52' of the chamber 30' can be accomplished via the displacement of fluid relative to the reservoir 62' such that there is flow from/to the volume within the chamber 30' between the first and second diaphragms 40', 50'. As can be see within FIG. 5, the amount of the third fluid 54 within the reservoir 62' via a first position of the member 66' is such that the first and second diaphragms 40', 50' are in their receptive first positions. FIG. 6 shows that the member 66' within the reservoir 62' has been moved from the first position (represented by the dash lines in FIG. 6) to the second, different position. The movement has pulled (e.g., displaced) some the third fluid 54 out of the volume (i.e., variable volume) between the two diaphragms 40', 50' within the chamber 30' and into the reservoir 62'. As such, the diaphragms 40', 50' have been moved to their respective second (i.e., blocking) positions against the walls 42', 52'.

It is to be appreciated that for each presented example within FIGS. 1-6, the respective apparatus is for controlling a signal (e.g., pressure signal) passage between a first passageway and a second passageway. In other words, controlling transmission along a potential single path or course. However, the disclosed subject matter includes the aspect of an apparatus controlling signal (e.g., pressure signal) passage along/among more than one passageway options. In other words, along potentially more than one path or course. Alternatively or additionally, the disclosed subject matter includes the aspect of an apparatus controlling more than one signal.

Figure 7:
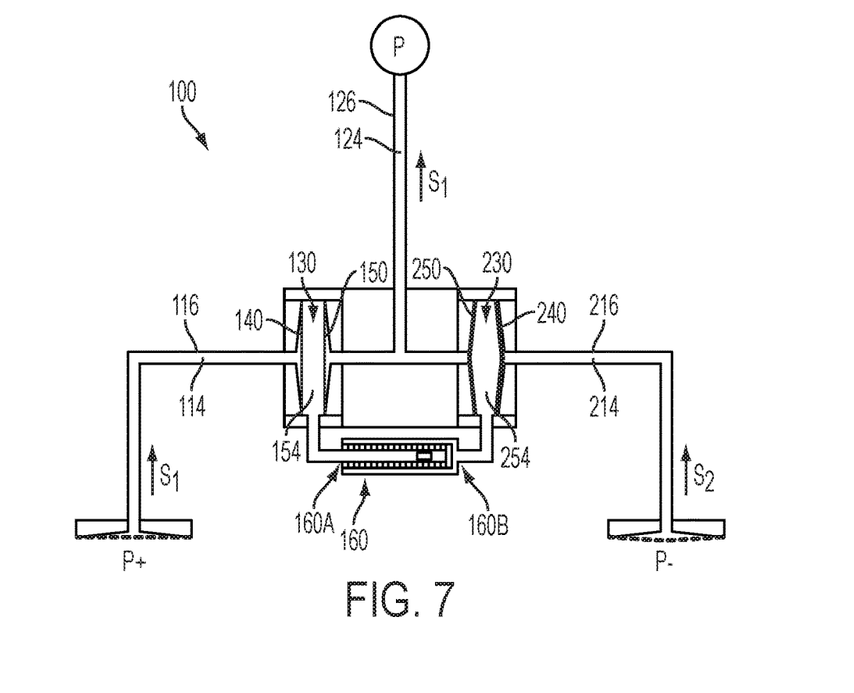
FIG. 7 is a schematic illustration of an example multi-signal control apparatus for controlling passage of two pressure signals in accordance with another aspect of the disclosed subject matter, and showing the apparatus in a first operational condition.
Figure 8:
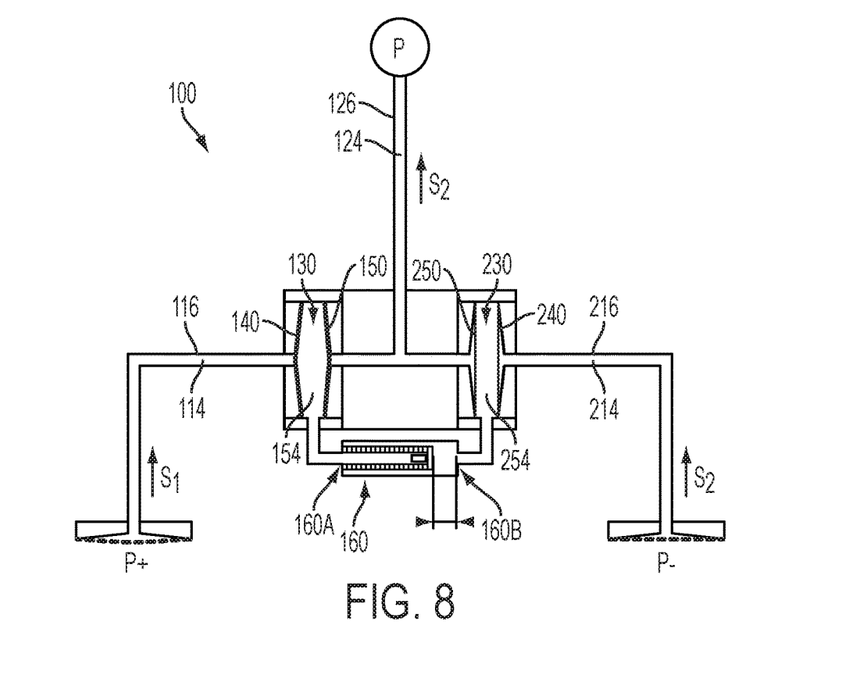
FIG. 8 is a schematic illustration similar to FIG. 7, but showing the apparatus in a second operational condition.

An example of such an apparatus 100 for controlling signal (e.g., pressure signal) passage along/among more than one passageway options and/or controlling more than one signal is shown within FIGS. 7 and 8. The example shown with FIGS. 7 and 8 includes structures that are similar to the structure shown within FIGS. 1 and 2. As such, the description provided for the example of FIGS. 1 and 2 is generally applicable to the example of FIGS. 7 and 8. It should be noted that the example of FIGS. 7 and 8 have two similar portions of such structures. As such, the description provided for the example of FIGS. 1 and 2 is generally applicable to two similar portions of the example of FIGS. 7 and 8.

Within the example of FIGS. 7 and 8, a first passageway 116 extends from a first signal source P+. A first fluid 114 is within the first passageway 116. Note that a first signal $S_1$ (e.g., a pressure signal) can be within the first fluid 114 within the first passageway 116. A second passageway 126 extends to a pressure signal destination P (e.g., a pressure sensor, detector, monitor, processor, etc.). A first chamber 130 is interposed between the first and second passageways 116, 126, has first and second diaphragms 140, 150 located therein and a third fluid 154 between the first and second diaphragms 140, 150. Note that there is a schematically represented device 160 that controls the volume of the third fluid 154 between the first and second diaphragms 140, 150 within the first chamber 130. Such device 160 will be described further following.

In distinction from the examples of FIGS. 1-6, the example of FIGS. 7 and 8 includes a third passageway 216 extending from a second signal source P−. A fourth fluid 214 is within this third passageway 216. Note that a second signal $S_2$ (e.g., a pressure signal) can be within the fourth fluid 214 within the third passageway 216. A second chamber 230 is interposed between the third and second passageways 216, 126, has third and fourth diaphragms 240, 250 located therein and a fifth fluid 254 between the third and fourth diaphragms 240, 250.

Note that within the shown example, the overall device 160 that controls the volume of the third fluid 154 between the first and second diaphragms 140, 150 within the first chamber 130 is shown to also control the volume of the fifth fluid 254 between the third and fourth diaphragms 240, 250 within the second chamber 230. Specifically, a device portion 160A controls the volume of the third fluid 154 between the first and second diaphragms 140, 150 and a device portion 160B controls the volume of the fifth fluid 254 between the third and fourth diaphragms 240, 250. Of course, the two device portions 160A, 160B could be separate devices or at least considered to be separate devices. Accordingly, each could be termed to be a device (i.e., a respective device for each of the third and fifth fluids).

Focusing upon the shown example, note that within the device 160, a piston is movable within a cylinder. As the piston moves, some fluid is simultaneously directed into one of the first and second chambers 130, 230 and some fluid is removed from the other of the first and second chambers. Within the shown example, there is an internal stop to limit movement of the piston relative to the cylinder. Again such structure could be separate devices or at least considered to be separate devices. Accordingly, each could be termed to be a device (i.e., multiple devices).

Within FIG. 7, the piston has been moved to a relatively right (as viewed within FIGS. 7 and 8). Such has simultaneously caused an increase in the volume of the fifth fluid 254 in the second chamber 230 and a decrease in the volume of the third fluid 154 in the first chamber 130.

Within the first chamber 130, the first and second diaphragms 140, 150 are not against the associated walls of the first chamber and the first and second diaphragms can be considered to be un-damped. By that, the first and second diaphragms 140, 150 can each slightly move (e.g., vibrate, flutter, etc.). Such slight movement can be caused by the signal $S_1$ traveling within the first fluid 114, through to the third fluid 154 within the first chamber 130, and through to the second fluid 124 in the second passageway 126. See that with FIG. 7, the signal proceeding within the second fluid 124 in the second passageway is schematically represented to be $S_1$.

Within the second chamber 230, the third and fourth diaphragms 240, 250 are against the associated walls of the second chamber and the third and fourth diaphragms can be considered to be damped. By that, the third and fourth diaphragms 240, 250 cannot move (e.g., vibrate, flutter, etc.). Even though there may be a signal $S_2$ (e.g., a pressure signal) within the fourth fluid 214 in the third passageway 216, the signal does not proceed through the second chamber 230, and does not proceed to the second fluid 124 in the second passageway 126. Again, this is schematically represented by the presence of only the first signal $S_1$ proceeding along the second passageway 126.

Within FIG. 8, the piston has been moved to a relatively left (as viewed within FIGS. 7 and 8). Such has simultaneously caused an increase in the volume of the third fluid 154 in the first chamber 130 and a decrease in the volume of the fifth fluid 254 in the second chamber 230.

Within the first chamber 130, the first and second diaphragms 140, 150 are against the associated walls of the first chamber and the first and second diaphragms can be considered to be damped. By that, the first and second diaphragms 140, 150 cannot move (e.g., vibrate, flutter, etc.). Even though there may be a signal $S_1$ (e.g., a pressure signal) within the first fluid 114 in the first passageway 116, the signal does not proceed through the first chamber 130, and does not proceed to the second fluid 124 in the second passageway 126.

Within the second chamber 230, the third and fourth diaphragms 240, 250 are not against the associated walls of the second chamber and the third and fourth diaphragms can be considered to be un-damped. By that, the third and fourth diaphragms 240, 250 can each slightly move (e.g., vibrate, flutter, etc.). Such slight movement can be caused by the signal $S_2$ traveling within the fourth fluid 214, through to the fifth fluid 254 within the second chamber 230, and through to the second fluid 124 in the second passageway 126. This is schematically represented by the presence of only the second signal $S_2$ proceeding along the second passageway 126.

Recall that the device 160 is schematically represented. To be sure, the device could certainly have structures that are more sophisticated than as schematically shown. Also, recall that the device 160 can be considered/provided via a plurality of devices. As such, the device 160 can be considered/provided to have first and second devices/portions 160A and 160B that control the volume of the third fluid 154 between the first and second diaphragms 140, 150 and the volume of the fifth fluid 254 between the third and fourth diaphragms 240, 250 as mentioned. Also, the device 160 can be considered/provided to have various other devices/portions. For example, the device 160 can be considered/provided to have a device/portion (e.g., a third device) that controls the first and second devices 160A, 160B such that the volume of the third fluid 154 bound between the first and second diaphragms 140, 150 and interposed between the first and second passageways 114, 124 at the first chamber 130 and the volume of the fifth fluid 254 bound between the third and fourth diaphragms 240, 250 and interposed between the third and second passageways 216, 126 at the second chamber 230 are controlled such the pressure signal (e.g., either $S_1$ or $S_2$) from only one of the first fluid 114 in the first passageway 116 and the fourth fluid 214 in the third passageway 216 proceeds to the second fluid 124 in the second passageway 126 at a time.

Of course, the presented examples are to be considered to be examples and are not to be considered as limitations. Other, different, possibly more complicated examples are contemplated and are to be considered to be within the scope of the disclosed subject matter. For example, an apparatus with a greater (e.g., greater that one or two) number of control points (i.e., chambers with diaphragms) is within the scope of the disclosed subject matter.

The disclosed subject matter has been described with reference to the example embodiments described above. Modifications and alterations will occur to others upon a reading and understanding of this specification. Example embodiments incorporating one or more aspects of the disclosed subject matter are intended to include all such modifications and alterations insofar as they come within the scope of the appended claims.

What is claimed is:

1. An apparatus for controlling passage of a pressure signal, the apparatus comprising:
    a first passageway for a first fluid therein;
    a second passageway for a second fluid therein;
    a chamber interposed between the first and second passageways, the chamber being partially bounded by a first wall adjacent a junction of the first passageway to the chamber and a second wall adjacent a junction of the second passageway to the chamber, the first wall being contoured as a convex shape with regard to the chamber and the second wall being contoured as a convex shape with regard to the chamber;
    a first, movable diaphragm located across a junction of the first passageway and the chamber, the first diaphragm being movable to plural positions including a position with the first diaphragm pressed against the first wall;
    a second, movable diaphragm located across a junction of the second passageway and the chamber, the second diaphragm being movable to plural positions including a position with the second diaphragm pressed against the second wall;
    a third fluid, the first and second diaphragms bounding the third fluid there between and interposed between the first and second passageways at the chamber; and
    a device for varying a volume of the third fluid bound between the first and second diaphragms and interposed between the first and second passageways at the chamber, a variation of the volume of the third fluid moving the first and second diaphragms, the device including a movable member and a reservoir in fluid communication with the third fluid bound between the first and second diaphragms, the movable member being movable to vary the volume of the reservoir, the movable member and the reservoir being configured such that the movable member being sufficiently movable to decrease the volume of the reservoir to introduce a sufficient portion of the third fluid bound between the first and second diaphragms into the chamber to cause the first and second diaphragms to be pressed against the first and second walls, respectively.

2. The apparatus as set forth within claim 1, wherein the apparatus is configured such that the first and second diaphragms being pressed against the first and second walls, respectively, prohibits passage of a pressure signal between the first fluid in the first passageway and the second fluid in the second passageway through the third fluid bound between the first and second diaphragms.

3. The apparatus as set forth within claim 1, wherein the second passageway is for connection to a pressure sensor and the second fluid is for transmission of pressure signals to the pressure sensor via the second passageway.

4. The apparatus as set forth within claim 3, wherein the apparatus controls passage of a plurality of pressure signals.

5. The apparatus as set forth within claim 1, wherein each of the first and second diaphragms is at least partially flexible.

6. The apparatus as set forth within claim 5, wherein each of the first and second diaphragms is flexible.

7. The apparatus as set forth within claim 1, wherein the first wall is contoured as a spheroid shape and the second wall is contoured as a spheroid shape.

8. The apparatus as set forth within claim 7, wherein each of the first and second diaphragms are configured to conform to the shape of the respective first and second walls when the first and second diaphragms are pressed against the first and second walls, respectively.

9. The apparatus as set forth within claim 7, wherein each of the first and second diaphragms are configured have a shape other than the shape of the respective first and second walls when the first and second diaphragms are not pressed against the first and second walls, respectively.

10. The apparatus as set forth within claim 1, wherein the movable member of the device includes a piston.

11. The apparatus as set forth within claim 1, wherein the movable member of the device includes a bladder.

12. The apparatus as set forth within claim 1, wherein the first diaphragm is movable to a position that the first diaphragm does not engage the first wall and the second diaphragm is movable to a position that the second diaphragm does not engage the second wall.

13. The apparatus as set forth within claim 12, wherein, with the first diaphragm in the position that the first diaphragm does not engage the first wall and with the second diaphragm in the position that the second diaphragm does not engage the second wall, transmission of the pressure signal between the first fluid in the first passageway and the second fluid in the second passageway through the third fluid bound between the first and second diaphragms is permitted.

14. A method for controlling passage of a pressure signal, the method comprising:
providing an apparatus for controlling passage of a pressure signal, the apparatus comprising:
a first passageway for a first fluid therein;
a second passageway for a second fluid therein;
a chamber interposed between the first and second passageways, the chamber being partially bounded by a first wall adjacent a junction of the first passageway to the chamber and a second wall adjacent a junction of the second passageway to the chamber, the first wall being contoured as a convex shape with regard to the chamber and the second wall being contoured as a convex shape with regard to the chamber;
a first, movable diaphragm located across a junction of the first passageway and the chamber, the first diaphragm being movable to plural positions including a position with the first diaphragm pressed against the first wall;
a second, movable diaphragm located across a junction of the second passageway and the chamber, the second diaphragm being movable to plural positions including a position with the second diaphragm pressed against the second wall;
a third fluid, the first and second diaphragms bounding the third fluid there between and interposed between the first and second passageways at the chamber; and
a device for varying a volume of the third fluid bound between the first and second diaphragms and interposed between the first and second passageways at the chamber, a variation of the volume of the third fluid moving the first and second diaphragms, the device including a movable member and a reservoir in fluid communication with the third fluid bound between the first and second diaphragms, and the movable member being movable to vary the volume of the reservoir; and
moving the movable member sufficiently to decrease the volume of the reservoir to introduce a sufficient portion of the third fluid between the first and second diaphragms into the chamber to cause the first and second diaphragms to be pressed against the first and second walls, respectively.

15. The method as set forth within claim 14, wherein the first and second diaphragms pressed against the first and second walls, respectively, prohibits passage of a pressure signal between the first fluid in the first passageway and the second fluid in the second passageway through the third fluid bound between the first and second diaphragms.

16. The method as set forth within claim 14, including connecting the second passageway to a pressure sensor and the second fluid is for transmission of pressure signals to the pressure sensor via the second passageway.

17. The method as set forth within claim 16, wherein the method controls passage of a plurality of pressure signals.

18. The method as set forth within claim 14, wherein the step of providing an apparatus includes providing that each of the first and second diaphragms are at least partially flexible.

19. The method as set forth within claim 14, wherein the step of providing an apparatus includes providing that the first wall is contoured as a spheroid shape and the second wall is contoured as a spheroid shape.

20. The method as set forth within claim 14, wherein the step of providing an apparatus includes providing that the movable member of the device includes at least one of a piston or a bladder.

* * * * *